UNITED STATES PATENT OFFICE 2,565,986

SURFACE ACTIVE AGENTS

John F. Olin, Grosse Ile, Mich., assignor to Sharples Chemicals Inc., a corporation of Delaware No Drawing. Application November 24, 1945, Serial No. 630,703

9 Claims. (Cl. 260—609)

The present invention pertains to the performance of washing, wetting and emulsifying operations, and the provision of a new class of surface active agents useful in the practice of such operations. The invention provides a new class of surface active agents which are unusually effective and which can be produced economically. These surface active agents constitute a new class of chemical compounds consisting of polyethylene glycol thioethers corresponding to the following general formula:

$$RS(R'O)_nH$$

wherein R represents a tertiary alkyl radical containing from 8 to 24 carbon atoms, R' represents the ethylene radical, and $n$ represents a number between 2 and 28.

These compounds can be produced economically by condensation of tertiary alkyl mercaptans having the carbon content designated by the radical R of the above formula with ethylene oxide.

The mercaptans themselves may be produced by condensation of an olefin of carbon content corresponding to the desired mercaptan with hydrogen sulfide, as described for example in my prior Patent 2,378,030 of June 12, 1945, by the use of the catalysts referred to in that patent or other catalysts.

The olefins used in manufacture of the mercaptans are olefins derived by polymerization of lower olefins, the polymerization reaction resulting in formation of the desired teritary base olefin capable of being condensed with hydrogen sulfide to form a mercaptan which is thereafter converted into the corresponding polyethylene glycol thioether by condensation with ethylene oxide. Ethylene oxide may be condensed with the mercaptan in a stoichiometric ratio of ethylene oxide:mercaptan between 2:1 and 28:1 to produce the desired surface active agent, the particular ratio of ethylene oxide to mercaptan depending partly upon the carbon content of the mercaptan and partly upon the particular type of surface activity desired. By proper choice of the ratio of ethylene oxide to mercaptan, and proper choice of the carbon content of the desired tertiary alkyl mercaptan, a class of surface active agents can be produced which is markedly superior to corresponding surface active agents similarly derived from primary normal mercaptans. Thus, by condensing ethylene oxide with a tertiary alkyl mercaptan containing between 10 and 14 carbon atoms in a stoichiometric ratio of ethylene oxide:mercaptan between 4:1 and 16:1, very efficient wetting agents can be formed. If products which have optium properties as detergents are desired, the ratio of ethylene oxide to mercaptan should be somewhat higher, as should also the number of carbon atoms in the mercaptan entering into the condensation reaction. Best results from the standpoint of detergency have been obtained in cases in which the carbon content of the mercaptan was between 12 and 16 and the stoichiometric ratio of the ethylene oxide to the mercaptan entering into the condensation reaction was between 4:1 and 20:1. While optimum results from the standpoint of wetting and detergency, respectively, have been obtained with compounds of the composition indicated above, it should be understood that the entire range indicated by the general formula above provides effective and economical surface active agents.

The ratio of ethylene oxide to mercaptan necessary to give optimum results depends largely on the carbon content of the mercaptan. The best surface active agents formed by condensing tertiary octyl mercaptan with ethylene oxide are those formed by using an ethylene oxide:mercaptan ratio of between 2:1 and 10:1. The best products from tertiary dodecyl mercaptan are those using ratios between 4:1 and 14:1; the best from tetradecyl are between 6:1 and 16:1 and the best from hexadecyl are between 8:1 and 20:1. In general, the optimum ratio of ethylene oxide to mercaptan tends to be higher, as the carbon content of the mercaptan is increased. In use of the agents of the invention in electrolyte solutions, a higher ethylene oxide : mercaptan ratio is recommended than otherwise. It should be understood that, when I speak of ethylene oxide:mercaptan ratios, I do not intend to imply thereby that a definite compound of the specified number of ethylene radicals is formed exclusively, since the product will comprise a blend of compounds of varying ethylene radical content, of which the average corresponds to the ratio of ethylene oxide to the mercaptan with which it is condensed. The symbol $n$, as used in this specification and claims, refers to this general average condition.

It should also be understood that the invention is not restricted to products derived from mercaptans individually or even from isomeric mixtures of mercaptans, as mixtures of mercaptans of varying carbon content may be condensed with ethylene oxide in practice of the invention.

In the practice of the invention, the tertiary base olefin to be condensed with hydrogen sulfide to form the mercaptan starting material may be a dimer, trimer or tetramer of isobutylene, a dimer, trimer or tetramer of pentene-2, a trimer, tetramer, pentamer or hexamer of propylene, or a polymer formed by copolymerization of mixtures of these olefins to produce copolymeric olefins.

After formation of the desired mercaptan from the starting olefin, ethylene oxide may be caused to react with the mercaptan with the aid of a basic catalyst. The preferred catalysts are alkali metal alcoholates, bases or basic salts, the carbonates, hydroxides and alcoholates of sodium and potassium being preferred. This catalyst may be added to the mercaptan, and heat and vacuum then applied in order to form a solution of the corresponding alkali metal mercaptide. Sodium methylate may, for example, be added to the mercaptan in an amount constituting between 0.2 and 2.0% of the weight of the mercaptan, and the product heated to 60° C. under 20 mm. vacuum until complete conversion of the sodium methylate to mercaptide has occurred, with concurrent removal of methanol.

The mercaptide solution in excess mercaptan may then be heated to a temperature of 90° C. during gradual introduction of ethylene oxide. At the beginning, reaction is strongly exothermic, but it becomes less exothermic after approximately an equimolar amount of ethylene oxide has been added, and heat is supplied to maintain the temperature as the reaction proceeds. A rapid reaction may be obtained by maintaining the temperature within the range between 120° and 150° C. at a super-atmospheric pressure of between 50 and 100 pounds per square inch during continued introduction of the ethylene oxide.

The reaction will proceed, although more slowly, at temperatures of 90° C. or lower, and use of low temperatures causes formation of products of especially light color, and excellent surface active properties. The initial stage of condensation of ethylene oxide with mercaptan may be conducted at temperatures (e. g., 60° C.) substantially below those at which further condensation may be accomplished with reasonable rapidity, and use of low initial temperatures is particularly recommended. The reaction may be accomplished at atmospheric pressure if desired, simply by bubbling ethylene oxide through the catalyzed mercaptan.

The reaction product obtained as described above is useful in many surface active applications without purification, but it is desirable in general that it be subjected to purifying treatment to reduce the alkalinity (due to residual catalyst), and improve the odor and the color. The catalyst can be removed by treatment with an acid clay such as Retrol clay, and this clay treatment also serves to improve the odor and color. If color and odor improvement are not important criteria, the catalyst may be neutralized by treatment of the product with acetic acid. It is desirable that neutralization be performed promptly after the ethylene oxide addition. The color may be improved by charcoal treatment, and the odor may be improved by heating the product under vacuum.

The products of the invention vary in color from light yellow to brown. Most of these compounds are liquids, but compounds with a high ethylene oxide:mercaptan mole-ratio generally solidify on cooling.

The following example represents practice of the invention in manufacture of a product obtained by condensing ethylene oxide with tertiary dodecyl mercaptan in a ratio of approximately 4:1. 15 grams of sodium methylate were added to 303 grams of t-dodecyl mercaptan which had been prepared by addition of hydrogen sulfide to tri-isobutylene. The mixture was heated to 70° C. under vacuum to remove evolved methanol. The resulting mercaptide solution was then heated to 90° C. and ethylene oxide was bubbled in under atmospheric pressure, heat being supplied to the reaction mixture by a water bath during the later stages of the reaction. After introduction of ethylene oxide for six hours, a total of 264 grams of ethylene oxide had reacted. The reaction product was a red oil, and was washed with water and treated with 25 grams of diatomaceous earth. It possessed marked surface activity.

The following examples illustrate further instances of practice of the invention.

*Example I—Dodecaethylene glycol t-dodecyl monothioether*

A ten gallon steel autoclave, fitted with a stirrer, vent and vacuum connection, and an ethylene oxide charging system, was charged with 15.15 pounds (0.075 pound moles) of t-dodecyl mercaptan (prepared in 99.6% purity by condensing hydrogen sulfide with tri-isobutylene). Dry sodium methylate (0.303 pound) was then added and the autoclave was closed and was heated to 100° C. for two hours under a vacuum of 10 mm. of mercury. The vacuum connection was then closed off and ethylene oxide was pumped in slowly during three hours and fifty minutes. The temperature rose slowly to 165° C. during the first hour and a half and then fell off to 145° C. toward the end of the reaction. A total of 39.6 pounds of ethylene oxide (0.9 pound moles) were added. The highest pressure observed during the reaction was 60 pounds per square inch gage. The product weighed 53.6 pounds.

The product was refined in the autoclave by stirring for four hours at 80° C. with two pounds of Retrol acid-activated clay. Upon filtering through a small filter press, a dark amber filtrate was obtained which turned to a semi-solid mush at 18° C. The product had the following average formula:

$$t\text{-}C_{12}H_{25}SC_2H_4O(C_2H_4O)_{10}C_2H_4OH$$

The percent sulfur was determined through the use of an oxygen bomb and was found to be 4.60% (theory—4.39%).

In the Draves-Clarkson test, the product had a concentration equivalent to a 25 second sinking time at 25° C. of 0.050%. Solutions in dilute NaCl, Na$_2$SO$_4$, HCl, and NaOH were clear. The following table illustrates the marked lowering by the product of the interfacial tension between industrial white oil and distilled water at 27° C.

| Concentration | Interfacial Tension |
|---|---|
| Per Cent | Dynes/cm. |
| 0.25 | 3.3 |
| 0.10 | 4.3 |
| 0.05 | 6.2 |
| 0.01 | 12.9 |
| 0.00 | 36.5 |

Laundering tests showed the product to be an effective detergent.

*Example II—Octaethylene glycol t-dodecyl monothioether*

A ten gallon autoclave was charged with 20.2 pounds (0.1 pound moles) of t-dodecyl mercaptan (prepared by the sulfhydration of tri-isobutylene) and 0.46 pound of sodium methylate. The reaction was conducted in a fashion similar to the previous example. Thirty-five pounds of ethylene oxide were added, and 54.6 pounds of crude product were obtained. After a clay refining step, the product was tested as a wetting agent by the Draves-Clarkson method. The concentration to give a 25 second sinking time at 25° C. was 0.038%. The product was an amber oil with a specific gravity at 20° C. of 1.025.

*Example III—Polyethylene glycol t-hexadecyl monothioether*

A mixture of 1430 grams of t-hexadecyl mercaptan (prepared by the addition of hydrogen sulfide to tetraisobutylene) and 71.5 grams of dry sodium methylate were heated slowly to 140° C. under a vacuum of 23 mm. of mercury in a flask. The clear mercaptide solution was charged into a two gallon stainless steel autoclave and was heated to 100° C. Ethylene oxide (about 3520 grams—80 moles) was pumped into the autoclave during one and one-half hours while the temperature rose to 165° C. The maximum pressure was fifty pounds per square inch. The product was withdrawn from the autoclave. It solidified to a light tan paste on cooling and weighed 5035 grams.

The crude product was stirred at 80° C. for one hour with 2% by weight Retrol clay. After this refining step, the product was analyzed and was found to contain 3.51% sulfur. Based upon one sulfur atom in the molecule, this value corresponds to a molecular weight of 913.4 and an ethylene oxide:mercaptan mole-ratio of 14.87.

The refined product was tested for surface-activity. It was found to be a fairly good wetting agent and a very powerful detergent.

*Example IV—Polyethylene glycol t-dodecyl monothioether*

Ethylene oxide was passed at atmospheric pressure into a weighed flask (at 110–120° C.) containing a mercaptide solution made from 2480 grams of 95% t-dodecyl mercaptan (prepared by the sulfhydration of tri-isobutylene) and 117 grams of sodium methoxide. When 3285 grams of ethylene oxide had been absorbed, 2140 grams of product were removed from the flask. The mole-ratio of ethylene oxide to mercaptan in this product was 6.41:1. The reaction was then continued under the same conditions until 700 grams more of ethylene oxide had been added. A 2075 gram portion of this product was removed from the flask. Its ethylene oxide:mercaptan ratio was 8.58:1. 450 grams of ethylene oxide were added to that portion left in the flask, and 1070 grams of this product, whose ethylene oxide:mercaptan ratio was 11.23:1 were withdrawn. The residual material was treated with 140 grams of ethylene oxide to give 1815 grams of a product having a 12.55:1 mole-ratio of ethylene oxide to mercaptan. The four different products were warmed with 5% by weight of Retrol clay and were filtered. Tests upon these products show that the 6.41:1 ratio material was the best wetting agent, giving a 25 second sinking time in the Draves-Clarkson test at a concentration of 0.028% agent in distilled water. The 25-second sinking time with the 8.58:1 ratio material was obtained with a 0.030% solution.

*Example V—Thioethers from t-octyl mercaptan*

To 5 moles of carefully purified tertiary octyl mercaptan were added 20 grams of sodium methylate. The mixture was then brought to reflux temperature at about 25 mm. pressure in order to remove the methanol. After being cooled somewhat, the mercaptan-mercaptide mixture was charged into a clean, dry, 2-gallon autoclave. Ethylene oxide was then introduced discontinuously in accurately weighed portions. Following each addition the contents of the autoclave were cooled down from the reaction temperature of approximately 130° C. to room temperature, and a 10 cc. sample of the product was removed for testing. The products thus obtained were tested individually for their wetting characteristics by the standard Draves-Clarkson method, the results of which are shown in the following table, in which the caption "Ethylene Oxide Content" indicates the molar ratio of ethylene oxide to mercaptan. These data refer to solutions of the wetting agent in pure water.

| Ethylene Oxide Content | Concentration Giving 25 sec. Sinking Time |
|---|---|
| 2.00 | 0.098 |
| 2.93 | .084 |
| 3.92 | .102 |
| 5.04 | .137 |
| 5.83 | .157 |
| 6.86 | .175 |
| 7.86 | .193 |
| 10.01 | .320 |

*Example VI—Thioethers from t-dodecyl mercaptan*

By a procedure entirely analogous to that described under Example V, tertiary dodecyl mercaptan was condensed intermittently and progressively with ethylene oxide, and the products were similarly evaluated by the Draves sinking test. The results of this evaluation are summarized in the following table:

| Ethylene Oxide Content | Concentration Giving 25 sec. Sinking Time |
|---|---|
| 7.29 | 0.100 |
| 7.85 | .074 |
| 8.97 | .051 |
| 10.02 | .046 |
| 11.03 | .047 |
| 12.25 | .052 |

*Example VII—Thioethers from t-tetradecyl mercaptan*

By a procedure entirely analogous to that described under Example V, tertiary tetradecyl mercaptan was condensed intermittently and progressively with ethylene oxide, and the products were similarly evaluated by the Draves sinking test. The results of this evaluation are summarized in the following table:

| Ethylene Oxide Content | Concentration Giving 25 sec. Sinking Time |
|---|---|
| 6.91 | 0.217 |
| 7.98 | .132 |
| 9.00 | .135 |
| 10.04 | .133 |
| 10.93 | .113 |
| 12.11 | .108 |
| 13.13 | .135 |
| 14.16 | .140 |

Example VIII—Thioethers from t-hexadecyl mercaptan

By a procedure entirely analogous to that described under Example V, tertiary hexadecyl mercaptan was condensed intermittently and progressively with ethylene oxide, and the products were similarly evaluated by the Draves sinking test. The results of this evaluation are summarized in the following table:

| Ethylene Oxide Content | Concentration Giving 25 sec. Sinking Time |
|---|---|
| 11.15 | .225 |
| 12.20 | .290 |
| 13.23 | .212 |
| 14.30 | .198 |
| 15.23 | .175 |
| 15.94 | .165 |
| 16.99 | .173 |
| 18.00 | .195 |
| 18.96 | .185 |
| 19.94 | .215 |
| 22.02 | .233 |
| 24.01 | .240 |
| 26.01 | .270 |

Various modifications are possible within the scope of the invention, and I do not therefore wish to be limited except by the scope of the following claims.

I claim:

1. As a new composition of matter, a polyethylene glycol thioether corresponding to the formula $$RS(R'O)_nH$$

wherein R represents a tertiary alkyl radical derived from a polymerized olefin and contains from 10 to 16 carbon atoms, R' represents the ethylene radical, and $n$ represents a number between 4 and 20.

2. As a new composition of matter having especial utility as a detergent, a polyethylene glycol thioether corresponding to the formula $$RS(R'O)_nH$$

wherein R represents a tertiary alkyl radical derived from a polymerized olefin and contains from 12 to 16 carbon atoms, R' represents the ethylene radical, and $n$ represents a number between 4 and 20.

3. As a new composition of matter having especial utility as a wetting agent, a polyethylene glycol thioether corresponding to the formula $$RS(R'O)_nH$$

wherein R represents a tertiary alkyl radical derived from a polymerized olefin and contains from 10 to 14 carbon atoms, R' represents the ethylene radical, and $n$ represents a number between 4 and 16.

4. As a new composition of matter, a polyethylene glycol thioether corresponding to the formula $$t\text{-}C_{12}H_{25}SC_2H_4O(C_2H_4O)_{10}C_2H_4OH$$

wherein the radical $C_{12}H_{25}$ is derived from a polymerized olefin.

5. A polyethylene glycol thioether of claim 1 wherein R of the formula represents a tertiary alkyl radical derived from a polymerized olefin and contains 12 carbon atoms, and wherein $n$ of the formula represents a number between 4 and 14.

6. A polyethylene glycol thioether of claim 1 wherein R of the formula represents a tertiary alkyl radical derived from a polymerized olefin and contains 14 carbon atoms, and wherein $n$ of the formula represents a number between 6 and 16.

7. A polyethylene glycol thioether of claim 1 wherein R of the formula represents a tertiary alkyl radical derived from a polymerized olefin and contains 16 carbon atoms, and wherein $n$ of the formula represents a number between 8 and 20.

8. As a new composition of matter, the condensation product of a tertiary alkyl mercaptan in which the tertiary alkyl radical contains 8 to 12 carbon atoms and has a structure corresponding to that of an isobutylene polymer with more than one mole of ethylene oxide per mole of said tertiary alkyl mercaptan, said condensation product being a sulfur-bearing alcohol with ether linkages and having the formula:

$$\text{Tertiary alkyl—S—CH}_2\text{—CH}_2\text{—O—(CH}_2\text{—CH}_2\text{—O—)}_x\text{H}$$

wherein $x$ is a whole number.

9. As a new composition of matter, the condensation product of a tertiary alkyl mercaptan in which the tertiary alkyl radical contains 8 to 24 carbon atoms and has a structure corresponding to that of an olefin polymer with more than one mole of ethylene oxide per mole of said tertiary alkyl mercaptan, said condensation product being a sulfur-bearing alcohol with ether linkages and having the formula:

$$\text{Tertiary alkyl—S—CH}_2\text{—CH}_2\text{—O—(CH}_2\text{—CH}_2\text{—O—)}_x\text{H}$$

wherein $x$ is a whole number.

JOHN F. OLIN.

REFERENCES CITED

The following references are of record in the file of this patent:

UNITED STATES PATENTS

| Number | Name | Date |
|---|---|---|
| 2,205,021 | Schuette et al. | June 18, 1940 |
| 2,392,103 | Schlosser et al. | Jan. 1, 1946 |